Figure 1:
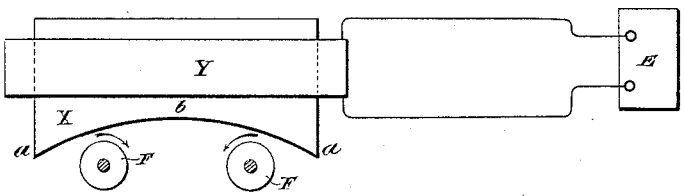

(No Model.)

N. TESLA.
ELECTRO MAGNETIC MOTOR.

No. 433,703. Patented Aug. 5, 1890.

Witnesses:
Raphael Netter
Ernest Hopkinson

Inventor
Nikola Tesla
by
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 433,703, dated August 5, 1890.

Application filed April 4, 1890. Serial No. 346,603. (No model.)

*To all whom it may concern:*

Be it known that I, NIKOLA TESLA, a subject of the Emperor of Austria-Hungary, from Smiljan, Lika, border country of Austria-Hungary, residing at New York, in the county and State of New York, have invented certain new and useful Improvements in Electro-Magnetic Motors, of which the following is a specification, reference being had to the drawings accompanying and forming a part of the same.

This invention is an improvement in alternating-current motors, and has for its general object to produce a single-circuit alternating-current torque-motor of economical and simple construction.

The nature of the invention will be understood from the following statement.

It is well known that if a magnetic core, even if laminated or subdivided, be wound with an insulated coil and a current of electricity directed through the coil the magnetization of the entire core does not immediately ensue, the magnetizing effect not being exhibited in all parts simultaneously. This I attribute to the fact that the action of the current is to energize first those laminæ or parts of the core nearest the surface and adjacent to the exciting-coil, and from thence the action progresses toward the interior. A certain interval of time therefore elapses between the manifestation of magnetism in the external and the internal sections or layers of the core. If the core be thin or of small mass, this effect may be inappreciable; but in the case of a thick core, or even of a comparatively thin one, if the number of alternation or rate of change of the current strength be very great the time interval occurring between the manifestations of magnetism in the interior of the core and in those parts adjacent to the coil is more marked, and in the construction of such apparatus as motors which are designed to be run by alternating or equivalent currents—such as pulsating or undulating currents generally—I have found it desirable and even necessary to give due consideration to this phenomenon and to make special provisions in order to obviate its consequences. The specific object of my present invention is to take advantage of this action or effect, and by rendering it more pronounced to utilize it in the operation of motors in general. This object I attain by constructing a field-magnet in which the parts of the core or cores that exhibit at different intervals of time the magnetic effect imparted to them by alternating or equivalent currents in an energizing coil or coils are so placed with relation to a rotating armature as to exert thereon their attractive effect successively in the order of their magnetization. By this means I secure a similar result to that which I have heretofore attained in other forms or types of motor in which by means of one or more alternating currents I have produced a rotation or progression of the magnetic poles or points of maximum attraction of the field of force.

In the drawings I have shown a simple form of motor, which will serve to demonstrate the principle of the mode of operation, which I have above described in general terms.

Figure 2:
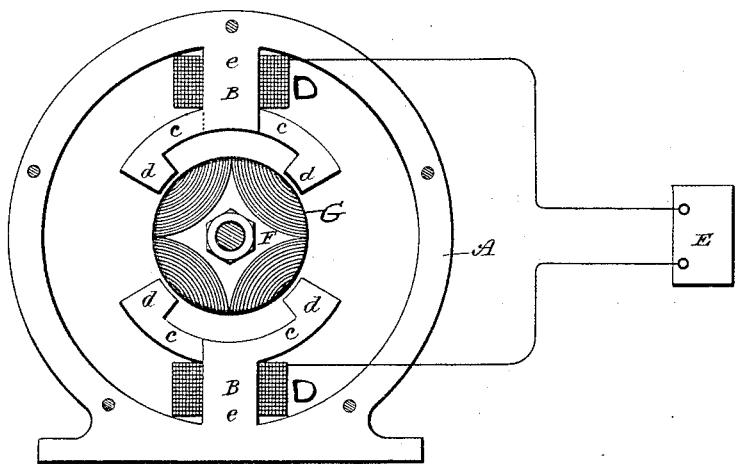
Figure 3:
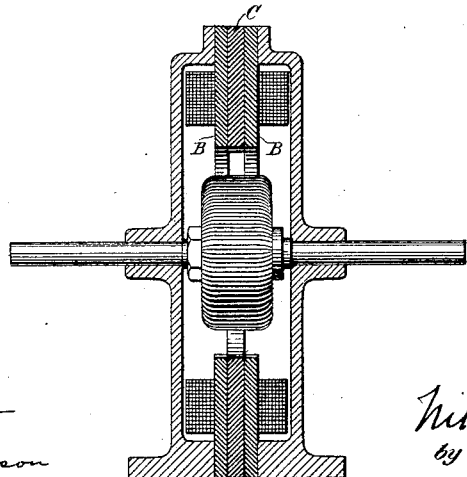

Figure 1 is a side elevation of such motor. Fig. 2 is a side elevation of a more practicable and efficient embodiment of the invention. Fig. 3 is a central vertical section of the same in the plane of the axis of rotation.

Referring to Fig. 1, let X represent a large iron core, which may be composed of a number of sheets or laminæ of soft iron or steel. Surrounding this core is a coil Y, which is connected with a source E of rapidly-varying currents. Let us consider now the magnetic conditions existing in this core at any point, as $b$, at or near the center, and any other point, as $a$, nearer the surface. When a current-impulse is started in the magnetizing-coil Y, the section or part at $a$, being close to the coil, is immediately energized, while the section or part at $b$, which, to use a convenient expression, is "protected" by the intervening sections or layers between $a$ and $b$, does not at once exhibit its magnetism. However, as the magnetization of $a$ increases, $b$ becomes also affected, reaching finally its maximum strength some time later than $a$. Upon the weakening of the current the magnetization of $a$ first diminishes, while $b$ still exhibits its maximum strength; but the continued weakening of $a$ is attended by a subsequent weakening of $b$. Assuming the current to be an alternating one, $a$ will now be reversed, while $b$ still continues of the first-imparted polarity. This action continues the magnetic condition of $b$, following that of $a$ in the manner above described. If an armature—for instance, a simple disk F, mounted to rotate freely on an axis—be brought into proximity to the core, a movement of rotation will be imparted to the disk, the direction depending upon its position relatively to the core, the tendency being to turn the portion of the disk nearest to the core from $a$ to $b$, as indicated in Fig. 1. This action or principle of operation I have embodied in a practicable form of motor, which is illustrated in Fig. 2. Let A in said figure represent a circular frame of iron, from diametrically-opposite points of the interior of which the cores project. Each core is composed of three main parts B, B, and C, and they are similarly formed with a straight portion or body $e$, around which the energizing-coil is wound, a curved arm or extension $c$, and an inwardly-projecting pole or end $d$. Each core is made up of two parts B B, with their polar extensions reaching in one direction and a part C between the other two and with its polar extension reaching in the opposite direction. In order to lessen in the cores the circulation of currents induced therein, the several sections are insulated from one another in the manner usually followed in such cases. These cores are wound with coils D, which are connected in the same circuit, either in parallel or series, and supplied with an alternating or a pulsating current, preferably the former, by a generator E, represented diagrammatically. Between the cores or their polar extensions is mounted a cylindrical or similar armature F, wound with magnetizing-coils G, that are closed upon themselves, as is usual in motors of this general class.

The operation of this motor is as follows: When a current impulse or alternation is directed through the coils D, the sections B B of the cores, being on the surface and in close proximity to the coils, are immediately energized. The sections C, on the other hand, are protected from the magnetizing influence of the coil by the interposed layers of iron B B. As the magnetism of B B increases, however, the sections C are also energized; but they do not attain their maximum strength until a certain time subsequent to the exhibition by the sections B B of their maximum. Upon the weakening of the current the magnetic strength of B B first diminishes, while the sections C have still their maximum strength; but as B B continue to weaken the interior sections are similarly weakened. B B may then begin to exhibit an opposite polarity, which is followed later by a similar change on C, and this action continues. B B and C may therefore be considered as separate field-magnets, being extended so as to act on the armature in the most efficient positions, and the effect is similar to that in my other forms of motor—viz., a rotation or progression of the maximum points of the field of force. Any armature—such, for instance, as a disk—mounted in this field would rotate from the pole first to exhibit its magnetism to that which exhibits it later.

It is evident that the principle herein described may be carried out in conjunction with other means, such as I have elsewhere set forth, for securing a more favorable or efficient action of the motor. For example, the polar extensions of the sections C may be wound or surrounded by closed coils L, as indicated by dotted lines in Fig. 2. The effect of these coils will be to still more effectively retard the magnetization of the polar extensions of C.

I do not wish to be understood as limiting myself to any particular construction of this form of motor, as the same principle of action or operation may be carried out in a great variety of forms.

What I claim is—

1. In an alternating-current motor, the combination, with an energizing-coil and a core composed of two parts, one protected from magnetization by the other interposed between it and the coil, of an armature mounted with the influence of the fields of force produced by said parts, as set forth.

2. The combination, in an alternating-current motor, of a rotating armature, a field-magnet composed of a coil and a core with two sections in proximity to the coil and an inner section between the same, the sections being formed or provided with polar projections extending in opposite directions over or around the armature, as set forth.

3. The combination, in an alternating-current motor, of a rotating armature, a frame and field-magnets thereon, each composed of an energizing-coil wound around a core made up of outer and inner or protected magnetic sections, each of which is formed or provided with independent laterally-extended pole pieces or projections, as herein described.

NIKOLA TESLA.

Witnesses:
ROBT. F. GAYLORD,
PARKER W. PAGE.